US010240588B2

(12) United States Patent
Reukers (10) Patent No.: US 10,240,588 B2
(45) Date of Patent: *Mar. 26, 2019

(54) ULTRA HIGH PRESSURE PUMP WITH AN ALTERNATING ROTATION TO LINEAR DISPLACEMENT DRIVE MECHANISM

(71) Applicant: Quantum Servo Pumping Technologies Pty Ltd, Campbellfield, VIC (AU)

(72) Inventor: Darren Reukers, Campbellfield (AU)

(73) Assignee: QUANTUM SERVO PUMPING TECHNOLOGIES PTY LTD, Campbellfield, Vic (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/646,765

(22) Filed: Jul. 11, 2017

(65) Prior Publication Data

US 2017/0306938 A1  Oct. 26, 2017

Related U.S. Application Data

(63) Continuation of application No. 14/954,110, filed on Nov. 30, 2015, now abandoned, which is a
(Continued)

(30) Foreign Application Priority Data

Mar. 26, 2008 (AU) .................................. 2008901442

(51) Int. Cl.
*F04B 9/02* (2006.01)
*F04B 11/00* (2006.01)
(Continued)

(52) U.S. Cl.
CPC .............. *F04B 9/02* (2013.01); *B24C 7/0007* (2013.01); *B24C 9/00* (2013.01); *B26F 3/004* (2013.01);
(Continued)

(58) Field of Classification Search
CPC . B24C 7/00; B24C 9/00; B24C 7/0007; B26F 3/004; F04B 11/005; F04B 11/0058;
(Continued)

(56) References Cited

U.S. PATENT DOCUMENTS 2,245,457 A   6/1941  Brassell
2,913,988 A  11/1959  Howard
(Continued)

FOREIGN PATENT DOCUMENTS

AU   2009227976 A1  10/2009
CN    101970875 A    2/2011
(Continued)

OTHER PUBLICATIONS

U.S. Appl. No. 12/934,547 (U.S. Pat. No. 9,212,657), filed Oct. 7, 2010 (Dec. 15, 2015), Darren Reukers (Techni Waterjet Pty Ltd.).
(Continued)

*Primary Examiner* — Patrick Hamo
*Assistant Examiner* — Joseph S. Herrmann
(74) *Attorney, Agent, or Firm* — Potomac Law Group, PLLC; Kenneth Fagin (57) ABSTRACT

A high pressure pump including a linear actuator having a servo motor to axially rotate a hollow rotor shaft in alternating directions, the servo motor having a stator positioned co-axially around the hollow rotor shaft with an interior of the rotor shaft being co-axially coupled to a drive member to convert axial rotation into reciprocal displacement, the drive member being constrained against linear movement and supporting a shaft. At least one piston is coupled to the shaft and the piston is arranged within a cylinder to define a pumping chamber, whereby alternating rotation of the rotor shaft causes reciprocal linear displacement of the piston to pressurize fluid in the pumping chamber. A drive mechanism includes a controller coupled to a servomotor
(Continued)

and an encoder to measure movement of the hollow rotor or output shaft and send a feedback signal proportional to the movement to the controller.

13 Claims, 4 Drawing Sheets

Related U.S. Application Data continuation of application No. 12/934,547, filed as application No. PCT/AU2009/000334 on Mar. 24, 2009, now Pat. No. 9,212,657.

(51) Int. Cl.
| | |
|---|---|
| B24C 9/00 | (2006.01) |
| B26F 3/00 | (2006.01) |
| F04B 17/03 | (2006.01) |
| H02K 7/06 | (2006.01) |
| B24C 7/00 | (2006.01) |
| F04B 23/06 | (2006.01) |
| F04B 49/06 | (2006.01) |
| F04B 53/08 | (2006.01) |
| F04B 53/10 | (2006.01) |
| F04B 53/14 | (2006.01) |
| F04B 53/16 | (2006.01) |

(52) U.S. Cl.
CPC .......... *F04B 11/0058* (2013.01); *F04B 17/03* (2013.01); *F04B 23/06* (2013.01); *F04B 49/06* (2013.01); *F04B 53/08* (2013.01); *F04B 53/10* (2013.01); *F04B 53/14* (2013.01); *F04B 53/16* (2013.01); *H02K 7/06* (2013.01); *F04B 11/005* (2013.01)

(58) Field of Classification Search
CPC .......... F04B 17/03; F04B 23/06; F04B 49/06; F04B 53/08; F04B 53/10; F04B 53/14; F04B 53/16; H02K 7/06
See application file for complete search history.

(56) References Cited

U.S. PATENT DOCUMENTS

| | | | | |
|---|---|---|---|---|
| 2,983,553 | A * | 5/1961 | Dexter | F16C 29/045 |
| | | | | 384/52 |
| 3,157,058 | A | 11/1964 | Haller | |
| 3,415,419 | A | 12/1968 | Jewett | |
| 3,847,507 | A * | 11/1974 | Sakiyama | B01L 3/0206 |
| | | | | 417/22 |
| 3,997,111 | A | 12/1976 | Thomas et al. | |
| 4,089,624 | A | 5/1978 | Nichols et al. | |
| 4,145,165 | A * | 3/1979 | Perkins | E21B 21/01 |
| | | | | 310/80 |
| 4,150,925 | A | 4/1979 | Perkins | |
| 4,232,562 | A | 11/1980 | Perkins | |
| 4,276,003 | A | 6/1981 | Perkins et al. | |
| 4,380,138 | A * | 4/1983 | Hofer | B24C 5/00 |
| | | | | 451/40 |
| 4,381,747 | A | 5/1983 | Kobayashi et al. | |
| 4,729,717 | A | 3/1988 | Gupta | |
| 5,130,585 | A | 7/1992 | Iwamatsu et al. | |
| 5,511,439 | A | 4/1996 | Las Navas Garcia | |
| 5,513,956 | A | 5/1996 | Lewis et al. | |
| 5,523,640 | A * | 6/1996 | Sparer | B29C 35/007 |
| | | | | 165/104.33 |
| 5,554,899 | A * | 9/1996 | Teramachi | B25J 9/102 |
| | | | | 310/20 |
| 5,557,154 | A | 9/1996 | Erhart | |
| 5,704,250 | A | 1/1998 | Black | |
| 5,772,403 | A | 6/1998 | Allison et al. | |
| 5,787,998 | A | 8/1998 | O'Hanlon et al. | |
| 5,844,335 | A | 12/1998 | Sekiguchi | |
| 5,992,222 | A | 11/1999 | Belonenko et al. | |
| 5,993,181 | A | 11/1999 | Hudelmaier | |
| 6,068,448 | A | 5/2000 | Muratsubaki et al. | |
| 6,086,339 | A | 7/2000 | Jeffrey | |
| 6,139,288 | A * | 10/2000 | Karasawa | F04B 17/042 |
| | | | | 310/68 B |
| 6,220,529 | B1 | 4/2001 | Xu | |
| 6,230,492 | B1 | 5/2001 | Kingston et al. | |
| 6,398,514 | B1 | 6/2002 | Smith et al. | |
| 6,575,264 | B2 * | 6/2003 | Spadafora | B62D 5/062 |
| | | | | 180/417 |
| 6,749,408 | B1 | 6/2004 | Eilertsen | |
| 7,080,792 | B2 | 7/2006 | Muratsubaki et al. | |
| 8,167,591 | B1 | 5/2012 | Sorensen | |
| 9,212,657 | B2 * | 12/2015 | Reukers | B24C 9/00 |
| 2002/0066345 | A1 | 6/2002 | Shepherd et al. | |
| 2007/0057579 | A1 | 3/2007 | Miyamoto | |
| 2008/0063535 | A1 | 3/2008 | Koehl | |
| 2010/0047083 | A1 | 2/2010 | Johnston | |
| 2010/0111721 | A1 | 5/2010 | Servin et al. | |
| 2011/0176940 | A1 | 7/2011 | Ellis et al. | |
| 2011/0177905 | A1 | 7/2011 | Choi | |
| 2013/0167697 | A1 | 7/2013 | Reukers | |
| 2013/0272873 | A1 | 10/2013 | Collins | |
| 2016/0076526 | A1 | 3/2016 | Reukers | |

FOREIGN PATENT DOCUMENTS

| | | |
|---|---|---|
| CN | 202160055 U | 3/2012 |
| CN | 103154532 A | 6/2013 |
| DE | 4300512 A1 | 7/1994 |
| EP | 2268922 A1 | 1/2011 |
| EP | 2616690 A1 | 7/2013 |
| FR | 2493419 A1 | 5/1982 |
| GB | 2385104 A | 8/2003 |
| JP | 2011-501061 A | 1/2011 |
| WO | WO-1990/012962 A1 | 11/1990 |
| WO | WO-2009/116770 A2 | 9/2009 |
| WO | WO-2009/117765 A1 | 10/2009 |
| WO | WO-2012/034165 A1 | 3/2012 |
| WO | WO-2015/076725 A1 | 5/2015 |

OTHER PUBLICATIONS

U.S. Appl. No. 14/954,110 (2016/0076526), filed Nov. 30, 2015 (Mar. 17, 2016), Darren Reukers (Techni Waterjet Pty Ltd.).
U.S. Appl. No. 13/822,409 (2013/0167697), filed Mar. 12, 2013 (Jul. 4, 2013), Darren Reukers (Techni Waterjet Pty Ltd.).
Parker, D. (1994) Positive Displacement Pumps—Performance and Application. 11th International Pump Users Symposium (1-5 pages).
Tackett, H. et al. (2008) Positive Displacement Reciprocating Pump Fundamentals—Power and Direct Acting Types. 24th International Pump Users Symposium (1-14 pages).
Patent Examination Report No. 1 dated Apr. 30, 2013, by the Australian Patent Office for application AU 2009227976, filed Aug. 31, 2010 (Applicant—Techni Waterjet Pty Ltd.)(4 pages).
Patent Examination Report No. 2 dated Jan. 9, 2015, by the Australian Patent Office for application AU 2009227976, filed Aug. 31, 2010 (Applicant—Techni Waterjet Pty Ltd.)(4 pages).
Claims Amendment dated Sep. 14, 2010 to the European Patent Office for EP Application No. 09726155.6 filed Mar. 24, 2009 (Inventor—Darren Reukers; Applicant—Techni Waterjet Pty Ltd.) (3 pages).
Extended European Search Report dated Mar. 10, 2017 by the European Patent Office for Patent Application No. 09726155.6, which was filed on Apr. 24, 2009 and published as EP 2268922 on Jan. 5, 2011 (Inventor—Darren Reukers et al.; Applicant—Techni Waterjet Pty Ltd.) (10 pages).
International Search Report was mailed on Jul. 6, 2009 by the International Searching Authority for Application PCT/AU2009/000334 filed Mar. 24, 2009 (Applicant—TechniWaterjet Pty Ltd // Inventor—Reukers) (6 pages).
Written Opinion was mailed on Jul. 6, 2009 by the International Searching Authority for Application PCT/AU2009/000334 filed Mar. 24, 2009 (Applicant—TechniWaterjet Pty Ltd // Inventor—Reukers) (9 pages).

(56) References Cited

OTHER PUBLICATIONS

International Preliminary Report on Patentability dated Jun. 25, 2010 by the International Bureau for Application PCT/AU2009/000334 filed Mar. 24, 2009 (Applicant—Techni Waterjet Pty Ltd // Inventor—Reukers) (10 pages).
Final Rejection dated Feb. 5, 2015 by the U.S. Patent and Trademark Office for U.S. Appl. No. 12/934,547, filed Mar. 24, 2009 and granted as U.S. Pat. No. 9,212,657 on Dec. 15, 2015 (Inventor—Darren Reukers;) (23 pages).
Final Rejection dated Aug. 29, 2013 by the U.S. Patent and Trademark Office for U.S. Appl. No. 12/934,547, filed Mar. 24, 2009 and granted as U.S. Pat. No. 9,212,657 on Dec. 15, 2015 (Inventor—Darren Reukers); (14 pages).
Issue Notification dated Nov. 24, 2015 by the U.S. Patent and Trademark Office for U.S. Appl. No. 12/934,547, filed Mar. 24, 2009 and granted as U.S. Pat. No. 9,212,657 on Dec. 15, 2015 (Inventor—Darren Reukers;) (1 page).
Non Final Rejection dated Feb. 28, 2013 by the U.S. Patent and Trademark Office for U.S. Appl. No. 12/934,547, filed Mar. 24, 2009 and granted as U.S. Pat. No. 9,212,657 on Dec. 15, 2015 (Inventor—Darren Reukers;) (14 pages).
Non Final Rejection dated May 6, 2014 by the U.S. Patent and Trademark Office for U.S. Appl. No. 12/934,547, filed Mar. 24, 2009 and granted as U.S. Pat. No. 9,212,657 on Dec. 15, 2015 (Inventor—Darren Reukers;) (24 pages).
Notice of Allowance dated Sep. 29, 2015 by the U.S. Patent and Trademark Office for U.S. Appl. No. 12/934,547, filed Mar. 24, 2009 and granted as U.S. Pat. No. 9,212,657 on Dec. 15, 2015 (Inventor—Darren Reukers;) (14 pages).
Response to Final Rejection dated Oct. 8, 2013 by the U.S. Patent and Trademark Office for U.S. Appl. No. 12/934,547, filed Mar. 24, 2009 and granted as U.S. Pat. No. 9,212,657 on Dec. 15, 2015 (Inventor—Darren Reukers;) (7 pages).
Response to Final Rejection dated Apr. 6, 2015 by the U.S. Patent and Trademark Office for U.S. Appl. No. 12/934,547, filed Mar. 24, 2009 and granted as U.S. Pat. No. 9,212,657 on Dec. 15, 2015 (Inventor—Darren Reukers;) (14 pages).
Response to Non Final Rejection dated Apr. 8, 2013 by the U.S. Patent and Trademark Office for U.S. Appl. No. 12/934,547, filed Mar. 24, 2009 and granted as U.S. Pat. No. 9,212,657 on Dec. 15, 2015 (Inventor—Darren Reukers;) (12 pages).
Response to Non Final Rejection dated Aug. 6, 2014 by the U.S. Patent and Trademark Office for U.S. Appl. No. 12/934,547, filed Mar. 24, 2009 and granted as U.S. Pat. No. 9,212,657 on Dec. 15, 2015 (Inventor—Darren Reukers) (11 pages).
Response to Final Office Action filed on Oct. 8, 2013 for U.S. Appl. No. 12/934,547, filed Oct. 7, 2010 and published as US 2011/0020155-A1 on Jan. 27, 2011 (Applicant—Techni Waterjet Pty, Ltd // Inventor—Reukers) (7 pages).
Advisory Action dated Oct. 24, 2013 for U.S. Appl. No. 12/934,547, filed Oct. 7, 2010 and published as US 2011/0020155-A1 on Jan. 27, 2011 (Applicant—Techni Waterjet Pty, Ltd // Inventor—Reukers) (7 pages).
Amendment Response to Final Office Action filed on Nov. 4, 2013 for U.S. Appl. No. 12/934,547, filed Oct. 7, 2010 and published as US 2011/0020155-A1 on Jan. 27, 2011 (Applicant—Techni Waterjet Pty, Ltd // Inventor—Reukers) (8 pages).
Non-Final Office Action dated May 6, 2014 for U.S. Appl. No. 12/934,547, filed Oct. 7, 2010 and published as US 2011/0020155-A1 on Jan. 27, 2011 (Applicant—Techni Waterjet Pty, Ltd // Inventor—Reukers) (24 pages).
Amendment and Response to Final Office Action filed on Aug. 3, 2015 for U.S. Appl. No. 12/934,547, filed Oct. 7, 2010 and published as US 2011/0020155-A1 on Jan. 27, 2011 (Applicant—Techni Waterjet Pty, Ltd // Inventor—Reukers) (15 pages).
First Office Action dated Dec. 31, 2011, by the SIPO for application CN 200980109183, filed on Mar. 24, 2009, and published as CN 101970875 on Feb. 9, 2011 (Applicant—Techni Waterjet Pty Ltd.) (Original—11 pages // Translation—5 pages).
Second Office Action dated Sep. 25, 2012, by the SIPO for application CN 200980109183, filed on Mar. 24, 2009, and published as CN 101970875 on Feb. 9, 2011 (Applicant—Techni Waterjet Pty Ltd.) (Original—3 pages // Translation—4 pages).
Third Office Action dated Mar. 5, 2013, by the SIPO for application CN 200980109183, filed on Mar. 24, 2009, and published as CN 101970875 on Feb. 9, 2011 (Applicant—Techni Waterjet Pty Ltd.) (Original—4 pages // Translation—6 pages).
Fourth Office Action dated Aug. 13, 2013, by the SIPO for application CN 200980109183, filed on Mar. 24, 2009, and published as CN 101970875 on Feb. 9, 2011 (Applicant—Techni Waterjet Pty Ltd.) (Original—3 pages // Translation—4 pages).
Fifth Office Action dated Nov. 28, 2013, by the SIPO for application CN 200980109183, filed on Mar. 24, 2009, and published as CN 101970875 on Feb. 9, 2011 (Applicant—Techni Waterjet Pty Ltd.) (Original—5 pages // Translation—7 pages).
Notice of Allowance dated May 14, 2014, by the SIPO for application CN 200980109183, filed on Mar. 24, 2009, and published as CN 101970875 on Feb. 9, 2011 (Applicant—Techni Waterjet Pty Ltd.) (Original—1 pages // Translation—2 pages).
Preliminary Amendment dated Nov. 30, 2015 to the U.S. Patent and Trademark Office for U.S. Appl. No. 14/954,110, filed Nov. 30, 2015 and published as US 2016/0076526-A1 on Mar. 17, 2016 (Inventor—Darren Reukers;) (5 pages).
Non Final Rejection dated Sep. 6, 2016 by the U.S. Patent and Trademark Office for U.S. Appl. No. 14/954,110, filed Nov. 30, 2015 and published as US 2016/0076526-A1 on Mar. 17, 2016 (Inventor—Darren Reukers;) (26 pages).
Response to Non-Final Office Action filed on Feb. 23, 2017 with the U.S. Patent and Trademark Office for U.S. Appl. No. 14/954,110, filed Nov. 30, 2015 and published as US 2016/0076526 on Mar. 17, 2016 (Inventor—Darren Reukers; Applicant—Techni Waterjet Pty Ltd.) (10 pages).
Terminal Disclaimer filed on Mar. 31, 2017 with the U.S. Patent and Trademark Office for U.S. Appl. No. 14/954,110, filed Nov. 30, 2015 and published as US 2016/0076526 on Mar. 17, 2016 (Inventor—Darren Reukers; Applicant—Techni Waterjet Pty Ltd.) (2 pages).
Terminal Disclaimer Approval dated Mar. 31, 2017 by the U.S. Patent and Trademark Office for U.S. Appl. No. 14/954,110, filed Nov. 30, 2015 and published as US 2016/0076526 on Mar. 17, 2016 (Inventor—Darren Reukers; Applicant—Techni Waterjet Pty Ltd.) (1 page).
Notice of Allowance dated Apr. 12, 2017 by the U.S. Patent and Trademark Office for U.S. Appl. No. 14/954,110, filed Nov. 30, 2015 and published as US 2016/0076526 on Mar. 17, 2016 (Inventor—Darren Reukers; Applicant—Techni Waterjet Pty Ltd.) (10 pages).
Notice of Abandonment dated Aug. 2, 2017 by the U.S. Patent and Trademark Office for U.S. Appl. No. 14/954,110, filed Nov. 30, 2015 and published as US 2016/0076526 on Mar. 17, 2016 (Inventor—Darren Reukers; Applicant—Techni Waterjet Pty Ltd.;) (1 page).
First Office Action dated Aug. 19, 2014, by the SIPO for application CN 201180043372, filed on Sep. 12, 2011, and published as CN 103154532 on Jun. 12, 2013 (Applicant—Techni Waterjet Pty Ltd.) (Original—5 pages // Translation—8 pages).
Second Office Action dated Jun. 2, 2015, by the SIPO for application CN 201180043372, filed on Sep. 12, 2011, and published as CN 103154532 on Jun. 12, 2013 (Applicant—Techni Waterjet Pty Ltd.) (Original—6 pages // Translation—9 pages).
Notice of Allowance dated Dec. 9, 2015, by the SIPO for application CN 201180043372, filed on Sep. 12, 2011, and published as CN 103154532 on Jun. 12, 2013 (Applicant—Techni Waterjet Pty Ltd.) (Original—1 pages // Translation—2 pages).
International Search Report dated Dec. 21, 2011 for Application No. PCT/AU2011/001171, which was filed on Sep. 12, 2011 and published as WO 2012/034165 on Mar. 22, 2012 (Inventor—Darren Reukers; Applicant—Techni Waterjet Pty Ltd) (3 pages).
Written Opinion dated Dec. 21, 2011 for Application No. PCT/AU2011/001171, which was filed on Sep. 12, 2011 and published as WO 2012/034165 on Mar. 22, 2012 (Inventor—Darren Reukers; Applicant—Techni Waterjet Pty Ltd) (4 pages).
International Preliminary Report on Patentability dated Mar. 19, 2013 for Application No. PCT/AU2011/001171, which was filed on (56) References Cited

OTHER PUBLICATIONS

Sep. 12, 2011 and published as WO 2012/034165 on Mar. 22, 2012 (Applicant—Techni Waterjet Pty Ltd; Inventor—Darren Reukers) (5 pages).
Preliminary Amendment dated Mar. 12, 2013 to the U.S. Patent and Trademark Office for U.S. Appl. No. 13/822,409, filed Mar. 12, 2013 and published as US 2013/0167697 on Jul. 4, 2013 (Inventor—Darren Reukers;) (6 pages).
Non Final Rejection dated Jan. 30, 2015 by the U.S. Patent and Trademark Office for U.S. Appl. No. 13/822,409, filed Mar. 12, 2013 and published as US 2013/0167697 on Jul. 4, 2013 (Inventor—Darren Reukers;) (17 pages).
Response to Non Final Rejection dated Jun. 29, 2015 to the U.S. Patent and Trademark Office for U.S. Appl. No. 13/822,409, filed Mar. 12, 2013 and published as US 2013-0167697 Jul. 4, 2013 (Inventor—Darren Reukers;) (16 pages).
Final Rejection dated Sep. 8, 2015 by the U.S. Patent and Trademark Office for U.S. Appl. No. 13/822,409, filed Mar. 12, 2013 and published as US 2013/0167697 Jul. 4, 2013 (Inventor—Darren Reukers) (16 pages).
Response to Final Rejection dated Dec. 8, 2015 to the U.S. Patent and Trademark Office for U.S. Appl. No. 13/822,409, filed Mar. 12, 2013 and published as US 2013/0167697 Jul. 4, 2013 (Inventor—Darren Reukers) (17 pages).
Non Final Rejection dated Dec. 23, 2015 by the U.S. Patent and Trademark Office for U.S. Appl. No. 13/822,409, filed Mar. 12, 2013 and published as US 2013/0167697 Jul. 4, 2013 (Inventor—Darren Reukers) (20 pages).
Response to Non Final Rejection dated Mar. 18, 2016 to the U.S. Patent and Trademark Office for U.S. Appl. No. 13/822,409, filed Mar. 12, 2013 and published as US 2013/0167697 Jul. 4, 2013 (Inventor—Darren Reukers) (12 pages).
Final Rejection dated Jun. 21, 2016 by the U.S. Patent and Trademark Office for U.S. Appl. No. 13/822,409, filed Mar. 12, 2013 and published as US 2013/0167697 Jul. 4, 2013 (Inventor—Darren Reukers) (19 pages).
Response to Final Office Action and Request for Continued Examination filed on Nov. 21, 2016 with the U.S. Patent and Trademark Office for U.S. Appl. No. 13/822,409, filed Mar. 12, 2013 and published as US 2013/0167697 on Jul. 4, 2013 (Inventor—Darren Reukers; Applicant—Techni Waterjet Pty Ltd.) (19 pages).
Non-Final Office Action dated Jan. 13, 2017 by the U.S. Patent and Trademark Office for U.S. Appl. No. 13/822,409, filed Mar. 12, 2013 and published as US 2013/0167697 on Jul. 4, 2013 (Inventor—Darren Reukers; Applicant—Techni Waterjet Pty Ltd.) (19 pages).
Response to Non-Final Office Action filed on May 5, 2017 with the U.S. Patent and Trademark Office for U.S. Appl. No. 13/822,409, filed Mar. 12, 2013 and published as US 2013/0167697 on Jul. 4, 2013 (Inventor—Darren Reukers; Applicant—Techni Waterjet Pty Ltd.) (19 pages).
Final Office Action dated Jul. 10, 2017 by the U.S. Patent and Trademark Office for U.S. Appl. No. 13/822,409, filed Mar. 12, 2013 and published as US 2013/0167697 on Jul. 4, 2013 (Inventor—Darren Reukers; Applicant—Techni Waterjet Pty Ltd.) (24 pages).
Supplementary European Search Report dated Dec. 15, 2017 by the European Patent Office for Patent Application No. 11824344.3, which was filed on Sep. 12, 2011 and published as EP 2616690 on Jul. 24, 2013 (Inventor—Darren Reukers; Applicant—Techni Waterjet Pty Ltd.) (7 pages).
Non-Final Office Action dated Oct. 31, 2017 by the U.S. Patent and Trademark Office for U.S. Appl. No. 13/822,409, filed Mar. 12, 2013 and published as US 2013/0167697 on Jul. 4, 2013 (Inventor—Darren Reukers; Applicant—Techni Waterjet Pty Ltd.) (21 pages).
Response to Non-Final Office Action filed on Jan. 23, 2018 with the U.S. Patent and Trademark Office for U.S. Appl. No. 13/822,409, filed Mar. 12, 2013 and published as US 2013/0167697 on Jul. 4, 2013 (Inventor—Darren Reukers; Applicant—Techni Waterjet Pty Ltd.) (11 pages).

\* cited by examiner

ULTRA HIGH PRESSURE PUMP WITH AN ALTERNATING ROTATION TO LINEAR DISPLACEMENT DRIVE MECHANISM

CROSS REFERENCE TO RELATED APPLICATION

This application is a continuation of U.S. patent application Ser. No. 14/954,110, filed Nov. 30, 2015, which is a continuation of U.S. patent application Ser. No. 12/934,547, filed Sep. 24, 2010, now U.S. Pat. No. 9,212,657, which is a National Phase Application of International Patent Application No. PCT/AU09/00334, filed Mar. 24, 2009, which claims priority to Australian Patent Application No. 2008901442, filed Mar. 26, 2008. The disclosure of each of the above-referenced applications is hereby incorporated herein by reference in its entirety.

INTRODUCTION

This invention relates to drive mechanisms including linear actuators. The invention also relates to a high pressure pump, in particular an ultra high pressure waterjet pump for use in waterjet cutting apparatus.

BACKGROUND OF THE INVENTION

Waterjet cutting apparatus has been used for some years to cut a variety of materials such as steel, aluminium, glass, marble, plastics, rubber, cork and wood. The work piece is placed over a shallow tank of water and a cutting head expelling a cutting jet is accurately displaced across the work piece to complete the desired cut. The cutting action is carried out by the combination of a very high pressure jet (up to 90,000 psi) of water entrained with fine particles of abrasive material, usually sand, that causes the cutting action. The water and sand that exit the cutting head are collected beneath the work piece in the tank.

It is in the industry associated with waterjet cutting that the expression "ultra high pressure" (UHP) waterjets are used to define a process where water is pressurised above 50000 psi and then used as a cutting tool. The high pressure water is forced through a very small hole which is typically between 0.1 mm and 0.5 mm in diameter in a jewel which is often ruby, sapphire or diamond.

Typically, two types of pumps are used to create the high pressure water, namely:
 a) intensifier pumps; and
 b) direct drive crank pumps.

Intensifier pumps are usually hydraulic pumps which can pressurise oil up to approximately 3000 psi. The oil is then forced into a cylinder which has a large piston attached to a smaller piston which is 1/20 the area of the hydraulic piston. The secondary piston is positioned in a cylinder which is filled with water. As the hydraulic piston is forced back and forth it forces the water piston to reciprocate creating a pressure some twenty times that of the hydraulic system. Although these systems are fairly reliably, they are inefficient due to the need to drive the hydraulic system. Typically, these pumps run at about 55% efficiency.

A more efficient pump is the direct drive crank shaft pump where a motor is coupled directly to a crank shaft. The crank shaft rotates whilst driving a number of small pistons, usually three, to reciprocate in cylinders thus pressurising the water. These pumps are fairly efficient, typically above 80%, when they are utilising the water being pressurised but they cannot store and hold pressure which means that when the waterjet apparatus is not actually cutting, the pressurised water is expelled from a release valve which means that the pumps use a similar amount of power whether sitting idle or in a cutting operation. These pumps are not as reliable as the intensifier pumps due to the high piston speed and the number of strokes required to make the same volume of ultra high pressure water.

It is the limitations of the pumps described above that have brought about the present invention.

SUMMARY OF THE INVENTION

According to one aspect of the present invention there is provided an ultra high pressure pump comprising a servo motor adapted to axially rotate a hollow rotor shaft in alternating directions, the servo motor having a stator positioned co-axially around the hollow rotor shaft with the interior of the rotor shaft being co-axially coupled to drive means to convert axial rotation into reciprocal displacement, the drive means being coupled to at least one piston having a head arranged within a cylinder to define a pumping chamber between the head of the piston and the cylinder, whereby alternating rotation of the rotor shaft causes reciprocal linear displacement of the piston to pressurise fluid in the pumping chamber.

Preferably the drive means is connected to pistons at both ends of the shaft, each piston being adapted to complete reciprocal motion within associated cylinders thus defined two pumping chambers.

Preferably the servo motor is located within a cylindrical housing that is in turn encased in a water cooling jacket. In a preferred embodiment the servo motor includes an encoder to count the frequency of rotation of the rotor shaft, the encoder being coupled to the control of the motor via a feedback loop.

Preferably the drive means comprises a linearly fixed nut that is threadedly engaged with the rotor shaft. The nut threadedly engaging a screw whereby axial rotation of the rotor shaft and rotor nut imparts reciprocal motion to the screw.

In a preferred embodiment the screw extends out each end of the pump to be coupled to the pistons.

According to another aspect of the present invention there is provided a drive mechanism comprising a controller coupled to a servo motor having a stator coaxially mounted around a hollow rotor, the hollow rotor including drive means co-axially coupled to an output shaft whereby the drive means converts rotational movement of the rotor to linear displacement of the shaft and an encoder to measure movement of the rotor or output shaft and send a feedback signal proportional to the movement to the controller.

According to a still further aspect of the present invention there is provided a linear actuator comprising a servo motor having a stator coaxially mounted around a hollow rotor, a drive member in engagement with the interior of the rotor, the drive member being constrained against linear movement and threadingly supporting a shaft to impart linear displacement of the shaft, and an encoder monitoring movement of the drive member or shaft and arranged to send a feedback signal to the servo motor whereby the operation and control of the servo motor causes controlled linear displacement of the shaft.

DESCRIPTION OF THE DRAWINGS

An embodiment of the present invention will now be described by way of example only with reference to the accompanying drawings in which.

DESCRIPTION OF THE PREFERRED EMBODIMENT

Whilst the preferred embodiment relates to a high pressure pump especially for use in waterjet cutting machinery, it is understood that the invention of the subject application is, in essence, a drive mechanism which can be used in a wide variety of scenarios where close careful control of the drive is necessary. Thus one of the uses of the drive mechanism is a linear actuator that can be used to replace hydraulic cylinders, which are inherently inefficient, noisy, dirty, and not precise, in a wide variety of engineering applications such as presses, robotics, materials handling and other similar uses. It is the use of a servo motor with a closed feedback loop that provides the opportunity to closely and carefully control the drive.

When the drive mechanism is used in a pump it comprises a servo motor that drives two reciprocating pistons that project from either end of the pump to operate within cylinders to pressurise water introduced into the cylinders to pressures of greater than 50000 psi.

As shown in FIGS. 1 to 4, the pump 10 comprises a cylindrical housing 11 that is encased within a cylindrical water cooled jacket 12. The housing 11 has end flanges 16, 17 that support a hollow rotor shaft 15 about windings 19 of a servo motor. One end 13 of the rotor shaft 15 is supported by an annular bearing 14 located between the housing 11 and the shaft 15. The other end 18 of the rotor shaft 15 supports a bearing housing 27 that supports a bearing 28.

Figures 1, 2:
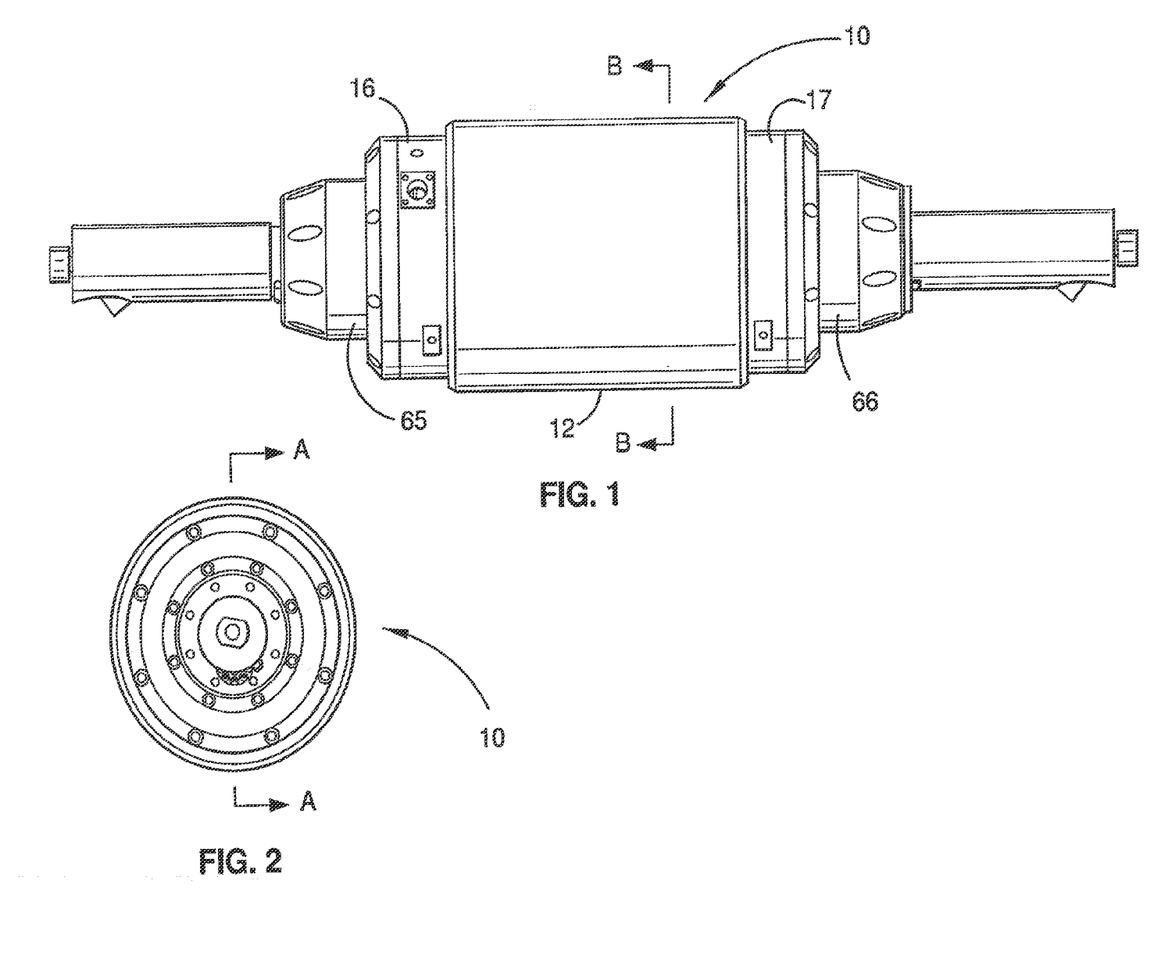
FIG. 1 is a side elevational view of an ultra high pressure pump.
FIG. 2 is an end elevational view of the pump.
Figure 3:
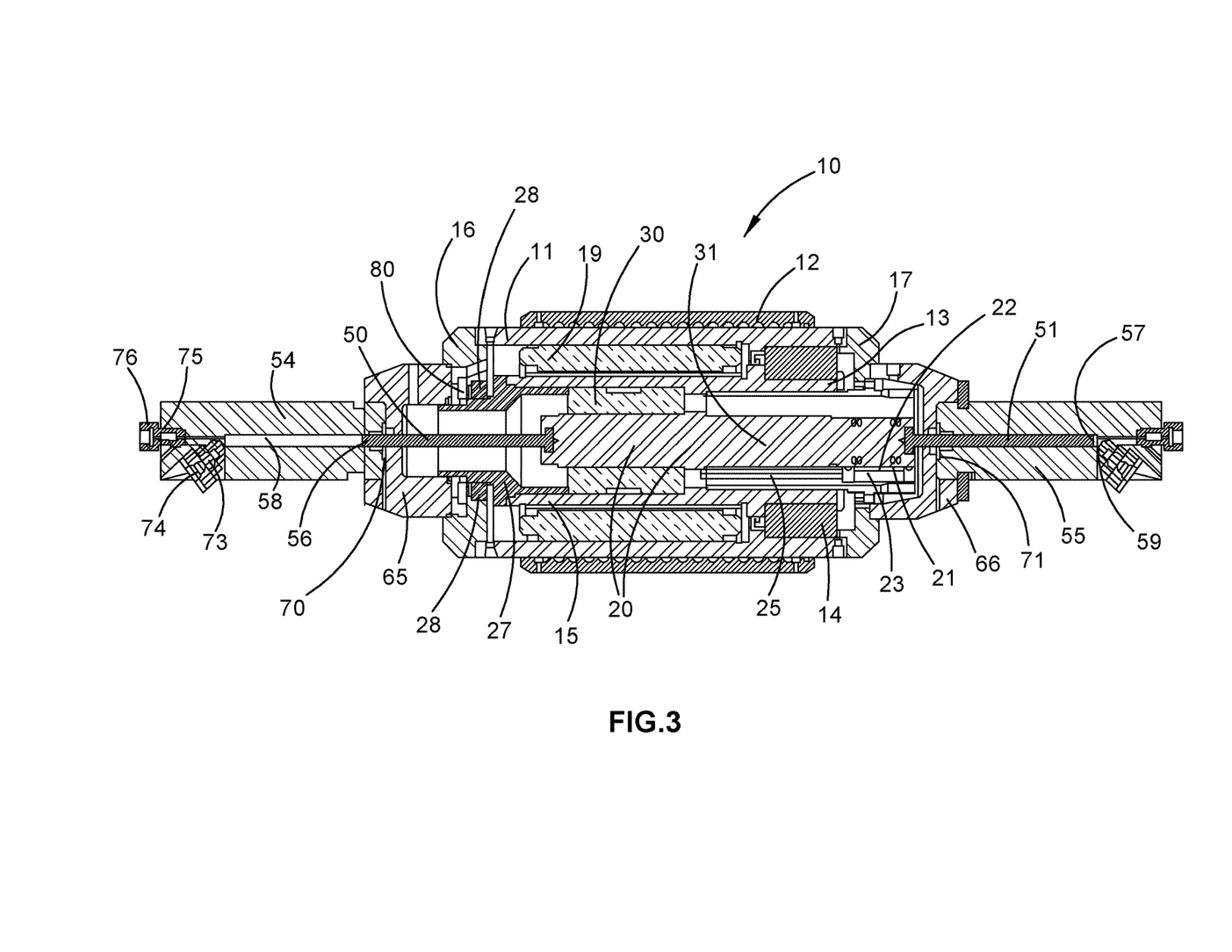
FIG. 3 is a sectional view of the pump taken along the lines A-A of FIG. 2.
Figure 4:
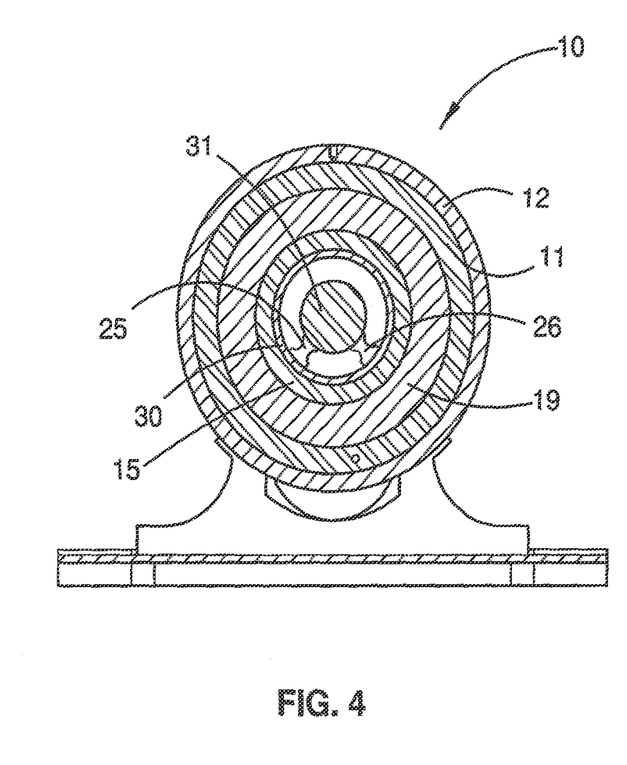
FIG. 4 is a sectional view of the pump taken along the lines B-B of FIG. 1.

The rotor shaft 15 houses a roller nut 30 which is in turn threadedly engaged onto an elongated screw 31. The roller nut 30 is in direct engagement with the interior of the shaft and is constrained against linear movement to rotate with the rotor shaft 15. The screw 31 has a threaded exterior 20 with a flat 21 machined on one end 22. The flat 21 supports linear bearings 23, 24 which run on elongate spaced apart rails 25, 26 (FIG. 4). The rails 25, 26 extend past the end flange 17 of the housing 11. The end 15 of the rotor shaft supporting the bearing 28 supports an externally positioned encoder 80.

The ends of the screw 31 are coupled to pistons 50 and 51 that are arranged to reciprocate within associated cylinders 54 and 55. The heads 56, 57 of the pistons define with the cylinders 54, 55 compression chambers 58, 59.

The rotor shaft 15 is located within the casing 11 about the spaced bearings 13 and 28 to facilitate axial rotation of the shaft 15 relative to the casing 11. The end flanges 16, 17 are bolted and secured to the casing 11 to hold the assembly together and the projecting pistons 50, 51 are enclosed within stainless steel mounts 65, 66 that support the cylinders 54, 55.

The servo motor causes the rotor shaft 15 to rotate which in turn rotates the roller nut 30 which is constrained from axial movement thus meaning that the screw 31 moves linearly within the roller nut 30. By reversing the direction of rotation of the rotor shaft 15, the screw 31 can thus be caused to reciprocate back and forth to give the reciprocating motion to the pistons 50, 51 to in turn pressurise the water that is introduced into the compression chambers 58, 59 via water inlets 60 to effect high pressure delivery of water from the outlets 61 at pressures greater than 50,000 psi.

Each cylinder 54, 55 has a low pressure water inlet 73 controlled by a check valve 74 communicating with the compression chambers 58, 59 at a 45° angle to axis of the cylinder. A high pressure outlet 75 is positioned co-axial to the end of the cylinder and includes a check valve 76.

High pressure seals 70, 71 are positioned between the inner ends of the cylinders 54, 55 and the pistons 50, 51 to prevent back pressure.

The servo motor is controlled by a computer numerical controller (CNC).

The servo motor which is used in the preferred embodiment is a brushless DC servo motor operating on a DC voltage of about 600 volts. This is a motor which is commonly used in machine tools and has traditionally been very controllable to provide the precision which is required in such machine tool applications. The pistons have a stroke of about 175 mm and reciprocate at approximately 120 strokes per minute. The movement of a piston in one direction lasts about 0.8 seconds. The pump is designed to operate in the most efficient mode with the delivery of water at 2 L per minute but it could operate with a delivery of up to 4 L per minute though this would reduce the life of the pump.

Because there is a direct drive between the servo motor and the linear motion of the pistons it is possible to achieve extremely accurate diagnostics in the machine. By use of the encoder 80 which reads very fine graduations (typically less than 0.04 mm radially, or some 20,000 counts per revolution in the preferred embodiment), along with the current and voltage information coming back into the CNC from the stator, it is possible to accurately calculate the linear speed and the motor torque to thus very accurately determine the water pressure and flow rate. This level of accuracy is far greater then that of traditional machines. Armed with this information it is therefore possible to determine if there is a problem with the pump. It has been discovered that when high pressure leaks go unattended these leaks very quickly cause fatal damage to the very expensive machine components to the pump. By constant monitoring of the operation of the pump, seal failures can be determined very early so that preventative maintenance can be introduced to prevent serious damage to the componentry.

An issue which can cause problems with equipment of this kind is the pulsating effect caused by the reciprocation of the pistons. Every time the servo motor reverses direction, there is a delay whilst the piston stops to then reverse direction. This delay can cause as much as a 5000 psi pressure drop which tends to cause the output pressure of the pump to pulsate. The pump of the subject application can overcome this problem by placing two pumps each with two reciprocating piston and cylinder assemblies in tandem and having the pumps running slightly out of phase. By cycling one drive at twice the speed of the other, while the other pump is reversing, it allows the first pump to build up backpressure to balance the drop in pressure which would be caused through reversal of the piston and thus ensure that the output pressure delivered to the waterjet cutter is constant without pulsing. By doing away with the pulsing effect, the main contributor to early fatigue of the components in the waterjet cutting machine is avoided.

The servo drive pump described above is far more efficient than an intensifier pump while still offering the desired ability to be able to store and hold pressure while not cutting, thus using only minimal power. The rotor shaft is designed to run at about 1500 rpm and the piston is about 180 mm in length running in a bore with a head diameter of 14 mm. This makes the whole assembly small, light and considerably quieter than an intensifier pump. The servo drive system is also very responsive and pressures can be adjusted within milliseconds with infinite control.

Figure 5:
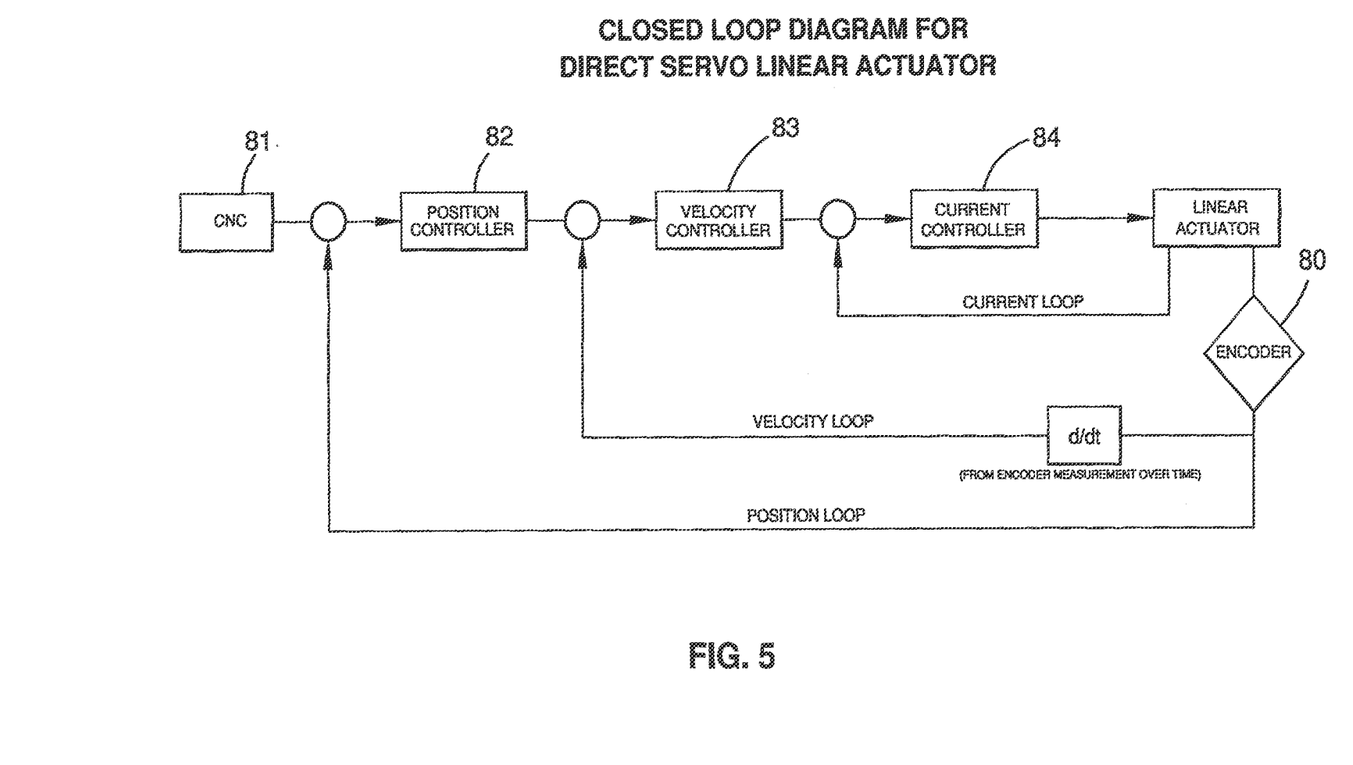
FIG. 5 is a diagram illustrating the feedback loop for a linear actuator.

The drive mechanism described above which is used in the embodiment shown in FIGS. 1 to 4 to drive an ultra high pressure pump can also be used in a number of other environments and has particular use as a linear actuator. FIG. 5 is an illustration of a closed loop showing the control of a linear actuator. The computer numerical controller 81 drives a position controller 82 that in turn is coupled to a velocity controller 83 which in turn is coupled to a current controller 84 to drive the servo motor which becomes the linear actuator. The encoder 80 sends two feedback signals, namely a velocity feedback signal that is fed to the velocity controller and a position feedback signal that is fed to the position controller. In this manner the computer controlling operation of the servo motor by monitoring the feedback signals provides an extremely positive and accurate control of the linear displacement of the output shaft which means that the linear actuator can be used to replace the hydraulic cylinders conventionally used in applications such as heavy duty presses, injection moulding machines, lifting tables and platforms or high load cutting or polishing machines. The linear actuator is particularly compact and thus is especially useful where there is a need for increased control of speed, position or force and limited space is available.

The claims defining the invention are as follows:

1. An ultra high pressure pump, comprising:
   a servo motor;
   a hollow rotor shaft;
   drive means;
   at least one piston;
   at least one cylinder; and
   at least one pumping chamber;
   the servo motor being adapted to axially rotate the hollow rotor shaft in alternating directions;
   the servo motor having a stator positioned co-axially around the hollow rotor shaft;
   the hollow rotor shaft being co-axially coupled to the drive means;
   the drive means being configured to convert axial rotation into reciprocal displacement;
   the servo motor including an encoder to monitor movement of at least one of the hollow rotor shaft and the drive means;
   the encoder being coupled to the servo motor via a closed feedback loop;
   the at least one piston having a head arranged within the at least one cylinder to define the at least one pumping chamber between the head and the at least one cylinder;
   the drive means being coupled to the at least one piston such that alternating rotation of the hollow rotor shaft causes reciprocal linear displacement of the at least one piston to pressurize fluid in the at least one pumping chamber;
   the drive means being coupled to an interior of the hollow rotor shaft;
   the pressurizing being to pressures greater than 345 MPa (50,000 psi);
   the hollow rotor shaft being supported by an annular bearing;
   the drive means being a screw supported by rails and linear bearings co-operable with the rails; and
   the rails passing through the annular bearing.

2. The ultra high pressure pump according to claim 1, wherein the encoder transmits a velocity feedback signal and/or a position feedback signal.

3. The ultra high pressure pump according to claim 1, wherein the stator is located within a cylindrical housing; and the cylindrical housing is encased in a water cooled jacket.

4. The ultra high pressure pump according to claim 3, wherein the cylindrical housing, the water cooled jacket, the stator, the hollow rotor shaft, and the drive means are all coaxial.

5. The ultra high pressure pump according to claim 1, wherein one end of the screw has flats on opposites sides thereof that engage the linear bearings.

6. The ultra high pressure pump according to claim 1, wherein there are a pair of cylinders disposed at opposite ends of the pump and a respective piston is coupled to each of opposite ends of the screw and is arranged within a respective one of the pair of cylinders so as to define a pumping chamber within the respective one of the pair of cylinders, with each piston being adapted to complete reciprocal motion within its associated cylinder.

7. The ultra high pressure pump according to claim 6, wherein each of said pair of cylinders has a low pressure water inlet controlled by a low pressure check valve and a high pressure outlet controlled by a high pressure check valve.

8. The ultra high pressure pump according to claim 7, wherein a high pressure seal is positioned between an inner end of each of the pistons and a respective one of each of the cylinders.

9. The ultra high pressure pump according to claim 8, wherein each piston has a stroke length of about 175 mm and reciprocates at about 120 strokes per minute to deliver between 2 and 4 liters of the fluid per minute.

10. A pumping arrangement, comprising:
    a first ultra high pressure pump according to claim 1; and
    a second ultra high pressure pump according to claim 1;
    wherein the first and second ultra high pressure pumps are coupled together to produce an ultra-high pressure jet of water, with the first and second ultra high pressure pumps being arranged such that the screws of the two pumps reciprocate out of phase with respect to each other to reduce pulsing of the water pressure.

11. An ultra high pressure pump, comprising:
    a servo motor;
    a hollow rotor shaft;
    drive means;
    at least one piston;
    at least one cylinder; and
    at least one pumping chamber;
    the servo motor being adapted to axially rotate the hollow rotor shaft in alternating directions;
    the servo motor having a stator positioned co-axially around the hollow rotor shaft;
    the hollow rotor shaft being co-axially coupled to the drive means;
    the drive means being configured to convert axial rotation into reciprocal displacement;
    the servo motor including an encoder to monitor movement of at least one of the hollow rotor shaft and the drive means;
    the encoder being coupled to the servo motor via a closed feedback loop;

the at least one piston having a head arranged within the at least one cylinder to define the at least one pumping chamber between the head and the at least one cylinder;

the drive means being coupled to the at least one piston such that alternating rotation of the hollow rotor shaft causes reciprocal linear displacement of the at least one piston to pressurize fluid in the at least one pumping chamber;

the drive means being coupled to an interior of the hollow rotor shaft; and the pressurizing being to pressures greater than 345 MPa (50,000 psi);

the drive means including a nut, which is in direct engagement with the hollow rotor shaft and which threadedly engages a screw whereby axial rotation of the hollow rotor shaft, and corresponding axial rotation of the nut, imparts linear motion to the screw;

the screw being supported by linear bearings each supported on elongate rails, with the linear bearings preventing rotation of the screw while facilitating longitudinal movement of the screw; and one end of the hollow rotor shaft being supported by an annular bearing and the rails passing through the annular bearing.

12. The ultra high pressure pump of claim 11, wherein the nut is a roller nut.

13. An ultra high pressure pump, comprising:
a servo motor;
a hollow rotor shaft;
drive means;
at least one piston;
at least one cylinder; and
at least one pumping chamber;
the servo motor being adapted to axially rotate the hollow rotor shaft in alternating directions;
the servo motor having a stator positioned co-axially around the hollow rotor shaft;
the hollow rotor shaft being co-axially coupled to the drive means;
the drive means being configured to convert axial rotation into reciprocal displacement;
the servo motor including an encoder to monitor movement of at least one of the hollow rotor shaft and the drive means;
the encoder being coupled to the servo motor via a closed feedback loop;
the at least one piston having a head arranged within the at least one cylinder to define the at least one pumping chamber between the head and the at least one cylinder;
the drive means being coupled to the at least one piston such that alternating rotation of the hollow rotor shaft causes reciprocal linear displacement of the at least one piston to pressurize fluid in the at least one pumping chamber;
the drive means being coupled to an interior of the hollow rotor shaft;
the pressurizing being to pressures greater than 345 MPa (50,000 psi);
the drive means including a nut that is in direct engagement with the hollow rotor shaft and that threadedly engages a screw whereby axial rotation of the hollow rotor shaft, and corresponding axial rotation of the nut, imparts linear motion to the screw;
the at least one piston being one of two pistons,
the at least one cylinder being one of two cylinders,
the two pistons being coupled to opposite ends of the screw, and
each of the two pistons being adapted to complete reciprocal motion within an associated one of the two cylinders, whereby the at least one pumping chamber is one of two pumping chambers;
each of the two cylinders having a low pressure water inlet controlled by a low pressure check valve and a high pressure outlet controlled by a high pressure check valve;
there being a high pressure seal positioned between an inner end of each of the two pistons and a respective one of the two cylinders; and
each of the two pistons having a stroke length of about 175 mm and reciprocating at about 120 strokes per minute to deliver between 2 and 4 liters of the fluid per minute.

* * * * *